US007036353B2

(12) United States Patent
Ketley

(10) Patent No.: US 7,036,353 B2
(45) Date of Patent: May 2, 2006

(54) DETECTION AND IDENTIFICATION OF VEHICLES WITH EXCESS PARTICULATES IN EXHAUST GASES

(75) Inventor: Peter Bernard Ketley, North Rocks (AU)

(73) Assignee: Alstom Australia Limited, (AU)

( * ) Notice: Subject to any disclaimer, the term of this patent is extended or adjusted under 35 U.S.C. 154(b) by 61 days.

(21) Appl. No.: 10/706,732

(22) Filed: Nov. 12, 2003

(65) Prior Publication Data

US 2004/0144186 A1 Jul. 29, 2004

(30) Foreign Application Priority Data

Nov. 12, 2002 (AU) .............................. 2002952605

(51) Int. Cl.
*G01N 21/00* (2006.01)

(52) U.S. Cl. ..................................................... 73/23.33

(58) Field of Classification Search ............... 73/28.01, 73/23.31, 23.32, 23.33, 116, 117.2, 118.2; 356/438; 250/338.5, 339.12, 339.13, 340, 250/573

See application file for complete search history.

(56) References Cited

U.S. PATENT DOCUMENTS

| | | | | |
|---|---|---|---|---|
| 5,583,765 | A * | 12/1996 | Kleehammer | 701/1 |
| 5,589,629 | A * | 12/1996 | Quinn | 73/23.31 |
| 5,719,396 | A * | 2/1998 | Jack et al. | 250/338.5 |
| 6,455,851 | B1 * | 9/2002 | Lord et al. | 250/338.5 |
| 2002/0010554 | A1 | 1/2002 | Stedman et al. | 702/28 |
| 2002/0092988 | A1 | 7/2002 | Didomenico et al. | 250/338.5 |

OTHER PUBLICATIONS

European Search Report—Jan. 7, 2005.

* cited by examiner

*Primary Examiner*—Robert Raevis
(74) *Attorney, Agent, or Firm*—St. Onge Stewart Johnston & Reens LLC

(57) ABSTRACT

A method and system for identifying, visually tracking and recording a moving vehicle exceeding a predetermined level of particulate emissions, the method including the steps of: detecting the particulate emissions of the vehicle at a first detection station; detecting the particulate emissions of the vehicle at a second detection station downstream of the first station; recording information identifying the vehicle if the detected emission of the vehicle at either station exceeds the predetermined level; and comparing the recorded information from both stations and identifying the vehicle if its identity appears in the recorded information for both stations and providing video tracking of the identified vehicle for an extended time period.

19 Claims, 4 Drawing Sheets

DETECTION AND IDENTIFICATION OF VEHICLES WITH EXCESS PARTICULATES IN EXHAUST GASES

FIELD OF THE INVENTION

The present invention relates to the detection of vehicles exceeding a predetermined level of particulate exhaust emissions.

The invention has been developed primarily for detecting and identifying heavy vehicles having excess particulates in their exhaust gases and will be discussed hereinafter with reference to this application. However, it will be appreciated that the invention is not limited to this particular field of use.

BACKGROUND OF THE INVENTION

Any discussion of the prior art throughout the specification should in no way be considered as an admission that such prior art is widely known or forms part of common general knowledge in the field.

Gaseous and particulate emissions, for example, sulphur dioxides, nitrogen oxides, metals, carbon dioxide and other volatile organic compounds, create air quality concerns due to their potential impact on environmental quality, human health and well-being. As a result, there has been increasing importance placed on monitoring, as well as reducing, such emission levels. Within the transport sector, difficulties have been encountered in policing exhaust gas emissions generated by vehicles.

Recent figures have shown that those responsible for excess particulate emissions, the "gross polluters", are primarily heavy vehicles. Indeed, it has been suggested that in Australia about 10% of heavy vehicles contribute to as much as 80% of heavy vehicle pollution. It therefore follows that these heavy vehicles with high particulate emissions pose a threat to the environment and general air quality Regimes currently in place for monitoring vehicles with unacceptable levels of particulate emissions often rely on trained observers monitoring vehicles over a statutorily imposed time period. Potentially infringing vehicles are pinpointed by these observers and picked up for further assessment and measurement. It will be appreciated that this technique is extremely subjective and may result in very few prosecutions.

Attempts have been made to provide more reliable systems for detecting smoky vehicles without requiring them to be stopped and connected to measuring apparatus. For example, remote vehicle emission sensors have been used to detect gross polluters in traffic streams. These systems are based on the absorption of an invisible infrared laser beam by polluting gases in exhaust plumes. Each gas absorbs the laser light at characteristic wavelengths thus allowing detection of the pollutant gas. A digital image of the offending vehicle is recorded after each measurement. Coupled to a number plate reader and a vehicle type classifier, these systems can identify polluter travel patterns, improve enforcement actions and of course, result in a cleaner environment. Examples of such systems include the ESP Accusan RSD 4000 system from Environmental Systems Products Holdings Inc of Connecticut.

However, the reliability of the above systems is questionable for a number of reasons, including the fact that instantaneous emissions may not be indicative of the average or usual amount of pollutants emitted by a vehicle.

SUMMARY OF THE INVENTION

It is an object of the invention to provide an improved form of emission detection.

According to a first aspect, the present invention provides a method for identifying a moving vehicle exceeding a predetermined level of particulate emissions, the method including the steps of:

detecting the particulate emissions of the vehicle at a first detection station;

detecting the particulate emissions of the vehicle at a second detection station downstream of the first station;

recording information identifying the vehicle if the detected emission of the vehicle at either station exceeds the predetermined level; and comparing the recorded information from both stations and identifying the vehicle if its identity appears in the recorded information for both stations.

According to a second aspect, the present invention provides an apparatus for identifying a moving vehicle exceeding a predetermined level of particulate emissions, the apparatus including:

means for detecting the particulate emissions of the vehicle at a first detection station;

means for detecting the particulate emissions of the vehicle at a second detection station downstream of the first station;

means for recording information identifying the vehicle if the detected emission of the vehicle at either station exceeds the predetermined level;

means for comparing the recorded information from both stations; and means for identifying the vehicle if its identity appears in the recorded information for both stations.

In a preferred embodiment, detection of the predetermined level of particulate emissions at either station enables an image capturing device downstream of its respective detection station for automatic actuation by the vehicle. In this embodiment, the image capturing device is triggered by an interruptible light beam actuated by the vehicle breaking the light beam.

Preferably, the particulate emissions are detected by the triggering of a smoke detector beam.

Preferably, the particulate emissions are exhaust emissions emitted from a vertical exhaust. The exhaust is preferably located between about 1 and 4 metres behind the first part of the vehicle higher than a predetermined height which may be chosen to suit the type of vehicles which are to be detected.

In a preferred embodiment, the distance between the first and second detection stations is approximately the distance a vehicle will travel in slightly greater than 10 seconds when proceeding at the regulatory speed limit.

Preferably, the image capturing device captures an image of the registration number of the vehicle. In this embodiment, the image of the registration number is OCR scanned. Furthermore, the image may be deleted if there is no match with an image produced in respect of the second detection station. Alternatively, if a match between the images is detected in respect of both detection stations then both of the images may be stored and video may also be taken and stored.

In one embodiment, detecting takes place in a tunnel. In one embodiment, detecting takes place when the vehicle is moving in the range of 36 kph (10 m/sec) to 80 kph (22.2 m/sec).

In accordance with a further aspect of the present invention there is provided, a system for identifying a vehicle emitting a high level of particulate emissions, the system comprising: a first particulate detection system for detecting emission from a vehicle as it transits a first transit point; an image triggering means located at a second transit point; a first imaging means interconnected to the triggering means for imaging vehicles as they transit the second transit point; and a processing means interconnected to the first particulate detection means and the first imaging means for locating identification parameters associated with the imaged vehicles when the first particulate detection system detects an emission exceeding a predetermined level.

BRIEF DESCRIPTION OF THE DRAWINGS

Preferred embodiments of the present invention will now be described, by way of example only, with reference to the accompanying drawings in which.

DESCRIPTION OF THE PREFERRED AND OTHER EMBODIMENTS

A first preferred embodiment provides for a vehicle particulate monitoring system which utilises a combination of number of known technologies. These can include optical character recognition (OCR) capable cameras and associated software, video cameras and digital video recording equipment, infra red light beam breaking detection devices, a PLC suitably programmed for control of the overall system and an infra red smoke detector. The system of the preferred embodiment utilises these devices to trigger the detection and subsequent photographing and identification of medium to heavy diesel powered vehicles emitting particulates in their exhaust gas (smoky vehicles).

The vehicles detected are restricted to those with a vertical exhaust stack which, in accordance with various statutory regulations must include vehicles with a Gross Vehicle Mass (GVM) of 4.5 tonnes or greater which are required to have vertical exhaust stacks. A further restriction in the preferred embodiment, is that the exhaust stack of the vehicle must be reasonably close to the front of the vehicle, say less than 5 metres, however, this figure should be taken as a guide and not a limit to the distance.

In order to confirm a vehicle is smoky in the context of a preferred embodiment, it is necessary to observe the vehicle emitting particulates for more than 10 seconds. In practice, this means that the preferred embodiment should be sited on a selection of roadway where the traffic is relatively free flowing and engines are under continuous load for this period of time.

Figure 1:
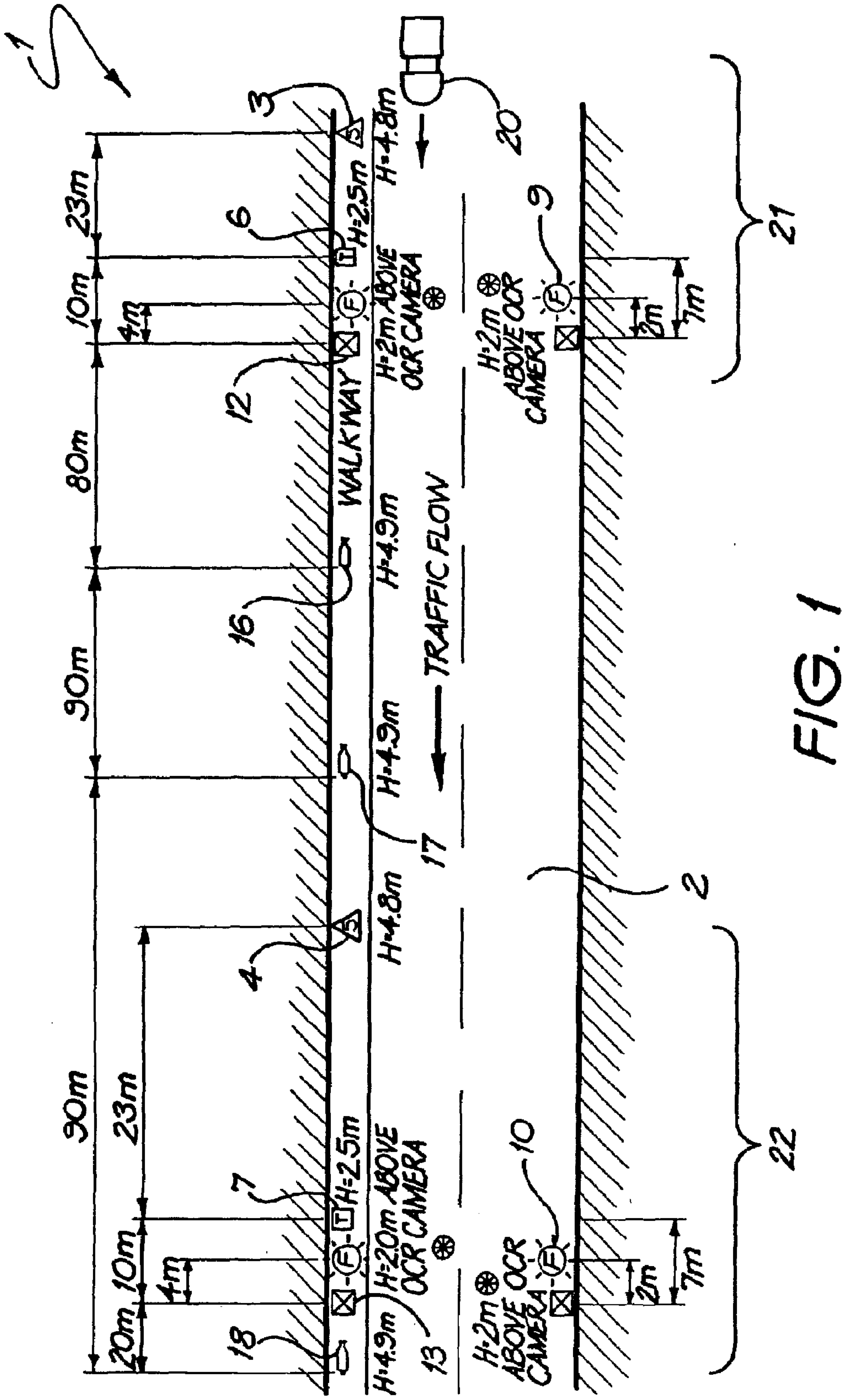
FIG. 1 is a schematic plan view illustrating the method and apparatus of a first embodiment of the invention as applied to vehicles moving to the left in the direction indicated by the arrow.

Turning initially to FIG. 1, there is illustrated a plan view of an arrangement 1 of the preferred embodiment. The preferred embodiment is situated on a road e.g. 2 along which traffic flows.

The arrangement includes a number of devices including a first and second smoky vehicle detection devices (SVDD) 3, 4. Next, vehicle positioning devices 6, 7 measure the position of a vehicle. Two OCR flash units 9,10 are also provided for use in conjunction with a camera device. The flash units being optional. Next, camera units 12, 13 are provided having optical character recognition capabilities. Further, a series of digital video devices 16–18 are also provided for capturing video information.

The system operates in two parts with one part 21 being located at the start of test path and one part 22 being located at the finish of the test path.

At the start of the test path 21, a smoky Heavy Goods Vehicle (HGV) 20 travels past a Smoky Vehicle Detection Device 3 which detects excessive smoke. This enables the output from the Vehicle Positioning Device 6, which, when triggered by the HGV, causes the front of the HGV to be photographed by an OCR capable camera 12. At the finish of the test path a similar process occurs.

The photos taking at the start and finish of the test path are stored in addition to simultaneous video taken via video cameras 16–18.

Photographs taken at the start and finish of the test path are scanned and OCR is performed on registration plates. Photos with matching registration numbers are paired and are then stored in a single encrypted file with video clips of the test path taken between the time of the "start" photograph and the "finish" photograph. This file can then be presented to a human operator at a convenient time and place for adjudication.

There can be a number of conditions in which a vehicle detected as smoky at the beginning of the test path may not ultimately have a Potential Offence File (POF) produced. These are:

- The vehicle was not smoky at the end of the test path. This may be because the smoke at the beginning was caused by power being applied immediately after a gear change and the vehicle didn't smoke thereafter. Alternatively, no smoke was emitted at the end due to no power being applied at the start of a gear change.
- The system timed out. Stop start traffic introduces too many possibilities for a vehicle to legally emit smoke. If the test path cannot be travelled with a minimum speed of say 10 metres/sec (36 kph) the system will time out.
- The vehicle travelled the test path in less than 10 seconds. This makes any video less than 10 seconds and therefore non-compliant with respect to the requirement of more than 10 seconds of observation.
- The system couldn't match the registration numbers from the OCR cameras at the beginning and end of the test path. It is not possible to eliminate all circumstances where OCR recognition of number plates may not be possible, such as occlusion by other vehicles or damaged number plates. This does not preclude manual matching of vehicles and production of a POF where the automatic matching did not occur.

Each installation of the preferred embodiment is individually assessed to determine the most appropriate combination and location of equipment based on the test path properties. Assessment includes, but is not limited to, posted speed, the number of traffic lanes and the ability to position cameras and other equipment in secure locations which are appropriate for their functional operation.

Each installation will require evaluation prior to selection of equipment. The equipment itself remains the same, however the number, position, housings and mounting methodology can change to suit the site. As an example, the equipment selection for tunnels will be markedly different from open roadways.

In one embodiment, all cameras are aimed directly into the path of oncoming traffic; all detection devices are operated at right angles to the traffic flow.

Smoky Vehicle Detection Devices

The SVDD devices 3, 4 work on the principle of the obscuration of IR light over an open path which is between the SVDD transmitter and SVDD receiver. This may be accomplished by a transmitter/receiver module with a reflector mounted on the opposite side of the carriageway (not shown), or alternatively a transmitter at one side and receiver at the other side of the carriageway. Such sensing systems are well known in the art. Preferably, the system operates with a response time of less than one second for the detection of HGV smoke as well as a slower averaging system to compensate for changes in ambient atmosphere obscuration and the optical path becoming dirty. The SVDD transmitter is typically an IR Light emitting Diode which has its output power controlled by a central programmable logic controller (not shown) which provides the appropriate variable output to compensate for ambient obscuration and dirty optical surfaces and which operates on a long time constant. The SVDD receiver is typically an IR PIN Diode which measures the light which is transmitted across the open path. The output from the IR PIN diode operates on a short time constant (typically a few milliseconds). Because the output of the IR PIN Diode should remain constant over the long term, rapid, short term changes provide analogue output signals indicating the presence and the amount of HGV smoke.

For the equipment "sets" located at the start 21 and the end 22 of the test path, the first piece of equipment in the direction of the traffic flow is the SVDD e.g. 3, 4. For installations with a single SVDD at the beginning and end of the test path, the beam should not be interrupted by any part of a vehicle, so it is mounted just above the height of the highest vehicle's traffic envelope. A corresponding light reflector or beam receiver is mounted on the opposite side of the carriageway at the same height. In alternative embodiments, multiple SVDD devices can be provided. For multiple SVDD installations, additional SVDDs can be mounted below the first SVDD, even if this will mean their light path may be blocked by vehicles. In this installation the PLC is reprogrammed to read the smoke levels recorded by the lowest positioned SVDD which has not had its beam totally blocked by a vehicle.

Vehicle Positioning Devices

The Vehicle Positioning Device (VPD) 6, 7 are a high reliability IR beam barriers, of a type commonly used to detect overheight vehicles or provide light barrier curtains for machinery guards. The VPD works on the principle of blocking the IR light over an open path which is between the VPD which may be a combined transmitter/receiver module with a reflector or a separate transmitter with the receiver mounted on the opposite side of the test path. The VPD has a response time of a few milliseconds when the beam is broken. Provided the VPD has had its output enabled by the SVDD detecting a smoky HGV within a predetermined prior timeframe, the VPD provides a trigger to the PLC indicating the position of the front of the HGV. The corresponding High Resolution OCR Still Camera 12, 13 can then be instructed to photograph the front of the HGV, which will include the front registration plate.

The VPD 6, 7 is the second piece of equipment in the equipment set. The VPD is mounted at a height at which all light passenger vehicles would normally pass under it but all heavy vehicles would normally break it. Usually this is not greater than 2.5 metres above the roadway but may be adjusted to local conditions. The corresponding light reflector or light receiver is mounted on the opposite side of the carriageway at the same height.

The VPD 6, 7 is normally positioned not less than 15 metres and not greater than 40 metres downstream of the SVDD 3, 4. The position depends on the posted speed; the lower the posted speed, the shorter the distance.

Trigger System Control

The Cameras 12, 13 which record smoky vehicles must be triggered to respond under the appropriate circumstances. That is, when a smoky HGV is at a precise place at the beginning and end of the test path. Both analogue and digital signals from the SVDD's and VPD's can be processed to ensure that cameras are instructed to take and store still photos and video as appropriate. A powerful industrial Programmable Logic Controller (PLC) with additional, separate communications interfaces is used in this instance. An example of such a PLC is an Allan Bradley Logix 5555 with appropriate I/O Modules and RS Logix Software.

Driver software within the PLC is configured to control all the processes mentioned above. As well as controlling compensation procedures for light path obscuration of the SVDDs due to dirt build up on the optical path and/or dirty ambient atmosphere, it also controls the selection of the signal from the appropriate SVDD in multiple SVDD installations and the "active window" time of the VPD, based on a speed determining algorithm.

High Resolution OCR Cameras 12, 13

High Resolution OCR Still Cameras (Still Cameras) 12, 13 take photos of smoky HGV's at both the start and finish of the test path. The number of Still Cameras at the start and/or finish of the test path will depend on each individual installation. Still Cameras are typically high quality "digital" cameras which instantaneously download their photograph into computers which are physically resident near to or in the same housing as the camera. The computers give the Still Cameras the necessary computing power and storage facility to allow for further processing of the images. The Still Cameras are typically located between 5 and 20 metres after the Vehicle Positioning Devices (VPD), depending on the requirements of the particular installation, but irrespective of location, the Still Cameras are aimed to take photographs of HGV's registration plates between 1 and 3 metres after the VPDs.

The Still Cameras would usually be selected to use Infra Red light cameras with compatible IR Flash Guns. This is to avoid the problem during periods of low ambient light levels of steady state high illumination or discharging high power visible light Flash Guns pointing directly at drivers. None the less, visible light cameras can also be used in appropriate circumstances.

The Still Cameras are directly linked to the PLC Trigger System. The command to take a photograph is given by the PLC Trigger System to the Still Cameras over this link. Once the image is captured, it can be scanned and the registration plate number determined using OCR software. The photo and the registration number, together with other relevant information are stored for matching with the same registration plate from the opposite end of the test path.

As required, appropriate lighting or flash devices e.g. 9, 10 are located to ensure that all registration plates are correctly illuminated for the Still Cameras.

Video Cameras

At least three video cameras 16–18, facing oncoming traffic, are used to video the test path. The video cameras are located such that any vehicle can be clearly and continuously viewed by the video cameras over the entire test path.

The video cameras continually take scene views which are stored digitally. When required, "video clips" from each camera, with a defined start and finish time (the time of the Still Photographs respectively) may be appended to the Still Camera photographs and other data to complete a Potential Offender File.

Potential Offender Files (POF's) can be viewed by a human operator to perform the final adjudication in any decision to proceed with an action against a smoky vehicle. Various alternative embodiments can include a link with a vehicle registration database to automatically proceed with an action.

Figure 4:
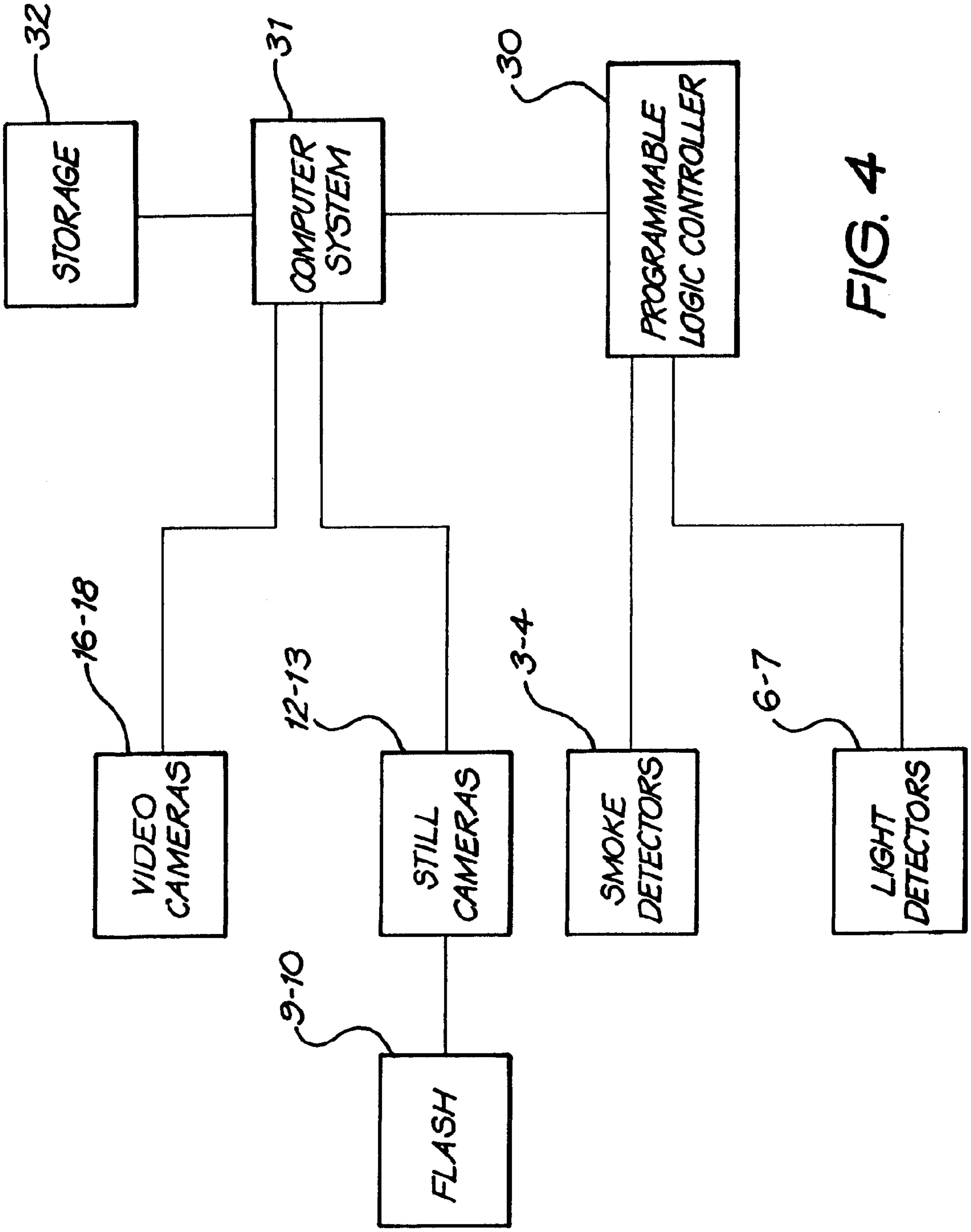
FIG. 4 is a schematic view of one form of hardware arrangement of the preferred embodiment.

It will be readily evident to those skilled in the art that the preferred embodiment can be constructed in many different ways. In FIG. 4, there is illustrate schematically one form of the hardware arrangement of the preferred embodiment wherein a programmable logic controller 30 is programmed to operate the smoke detectors (SVDD) 3, 4 and the HGV passage detectors 6, 7. Similarly, the video cameras 16–18 and Still Cameras 12–13 are interconnected to a computer system 31 for download and storage 32 of video information. The computer system 31 can in turn be interconnected with the network for the transfer and review of possible infringement files.

Figure 2:
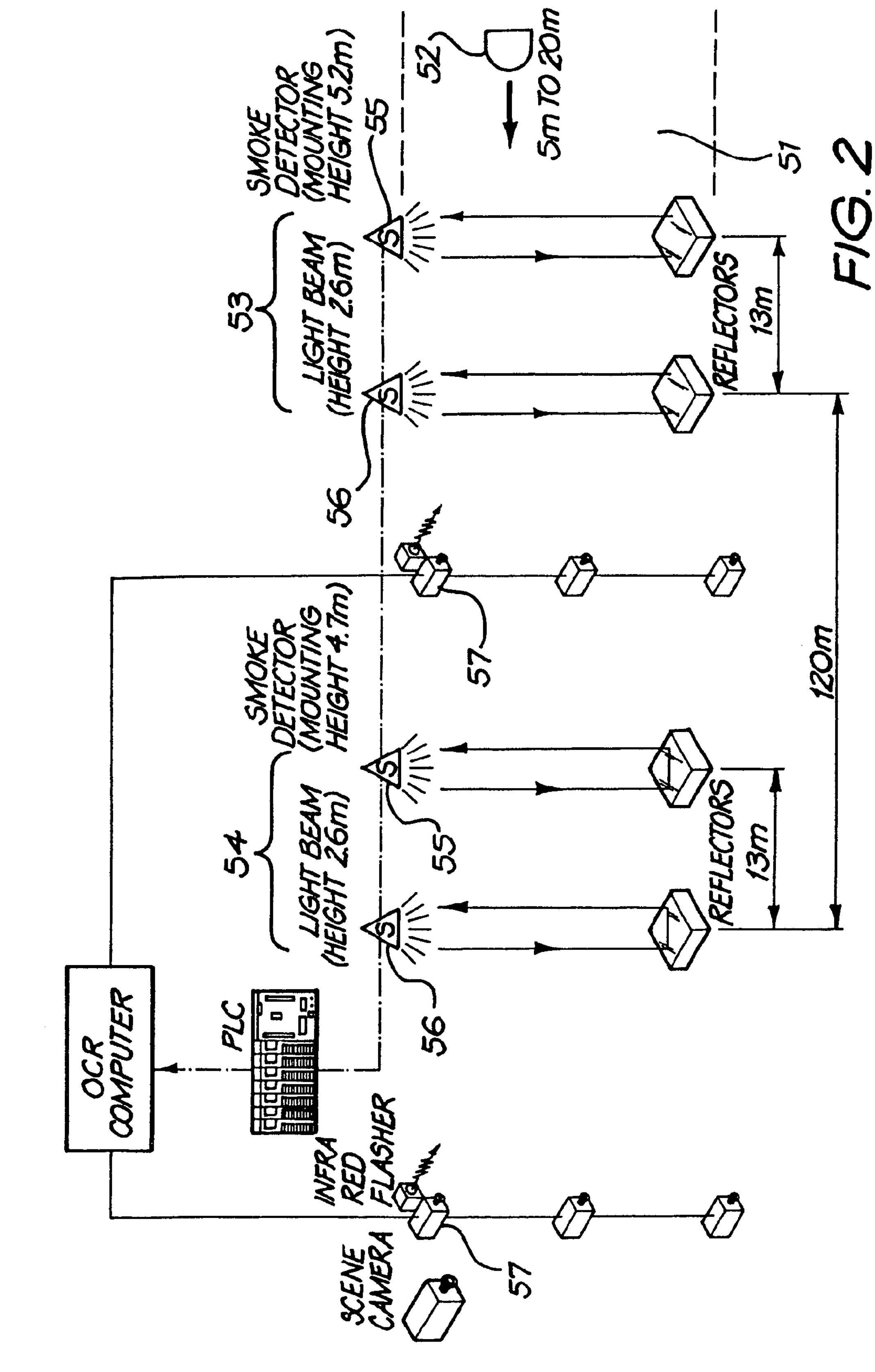
FIG. 2 is a schematic plan view illustrating the layout of a second embodiment.
Figure 3:
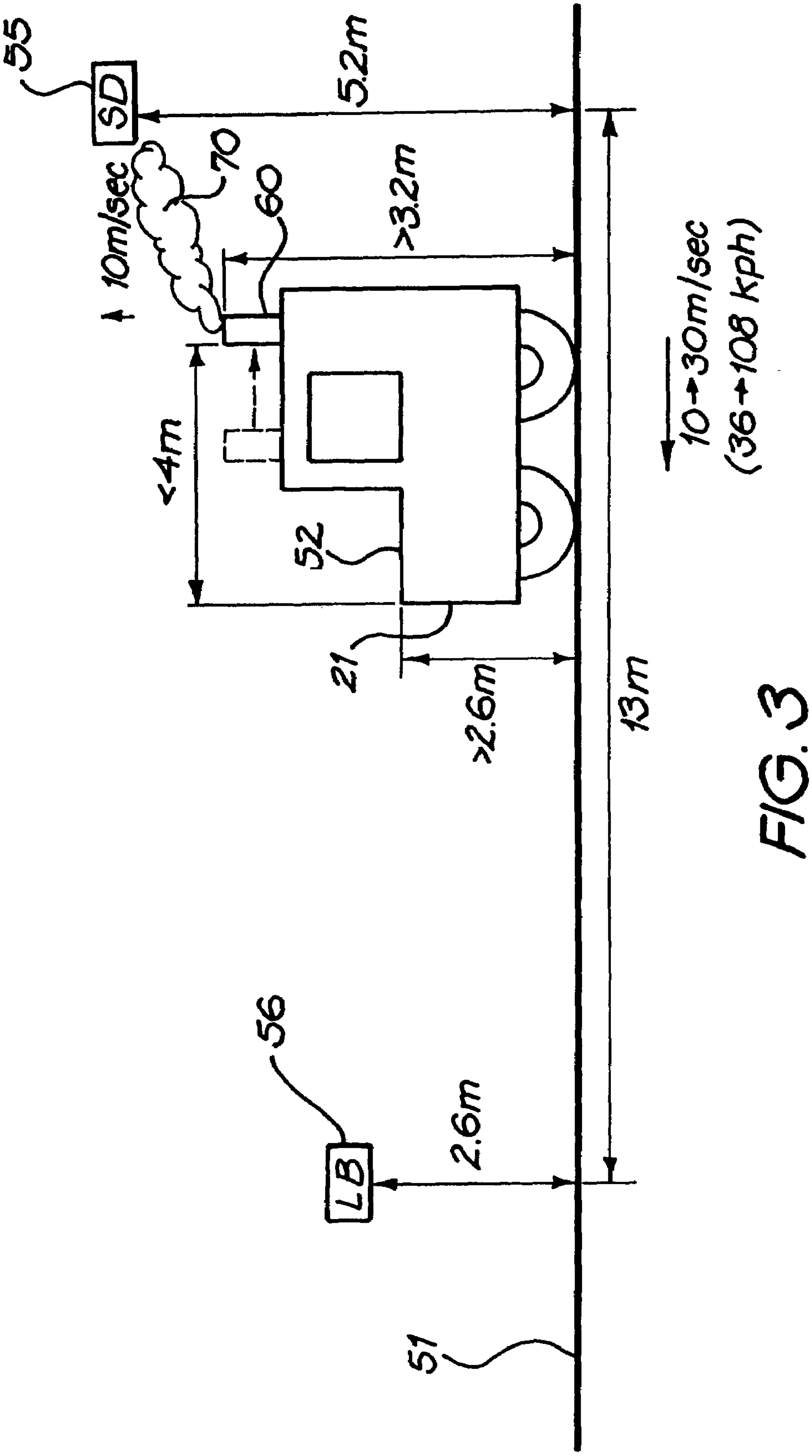
FIG. 3 is a schematic side view of the operation of the second embodiment.

Referring now to FIGS. 2 and 3, an alternative similar embodiment will now be described. Again the method of the alternative embodiment is shown as applied to a roadway 51, where the vehicle 52 proceeds in a direction from right to left. Two detection stations 53 and 54 are provided for detecting the particulate emissions emitted from vehicle 2. As shown in FIG. 2, the second detection station 54 is 240 metres downstream of the first detection station 53. Each of the detection stations includes a means e.g. 55 for detecting levels of particulate emissions. More specifically, predetermined levels of particulate emissions are detected by the triggering of a smoke detector beam. The detection stations 53 and 54 also include a means 57 for recording information identifying the vehicle if the detected particulate emissions exceed a predetermined level. More specifically, the triggering of the smoke detector 55 opens an output possibility from an interruptible light beam. Upon the vehicle passing through the light beam an image capturing device 57 is activated.

Turning to FIG. 3 where there is shown a schematic side view of a smoky vehicle 52 traversing the roadway 51. Assuming a smoky vehicle is travelling at a maximum speed of say 108 kph (30 m/sec) with a stack 60 at a height of at least 3.2 metres, an exhaust 70 with vertical velocity of 10 m/sec and with the smoke detector 55 at a height of 5.2 metres, then a smoky vehicle will travel 6 metres past the detector 55 before the exhaust reaches the level of the smoke detector 55. A time of 100 milliseconds is allowed for the detector to respond during which the vehicle travels a further 3 metres, giving a total of 9 metres. Assuming that the stack 60 is placed a maximum 4 metres behind the first part 61 of the vehicle which is 2.6 metres or higher, the light beam 6 should be placed at least 13 metres after the smoke detector as shown in the FIG. 3.

Returning to FIG. 2, if excessive particulate emissions are recorded for vehicle 52 at the first detection station, a first image of the registration number is taken by camera 57. A similar process is repeated at the station 54. Should vehicle 52 still be emitting excessive particulates by the time it reaches the second detection station a second image will be produced. With the aid of OCR recognition, a match can be made and the images at both stations are stored and a video taken and stored for later evaluation.

If there are no other vehicles taller than 2.6 metres in the "scene" photograph, then it can be reasonably assumed that it is likely that vehicle 52 has produced excessive smoke between the first and second detection stations.

Alternatively, vehicle 52 may trigger the smoke detector at the first station 53 causing the interruptible light beam mode to switch to operational mode and thus activate the camera upon the vehicle passing through the light beam. However, in this case, the vehicle stops emitting excessive particulate emissions and thus the smoke detector at the second station is not triggered and a second photograph is not taken. Accordingly, the image taken at the first detection station may be discarded.

In a longitudinally ventilated tunnel, airflow will normally be in the direction of the traffic except at the tunnel exit portal. This means that exhaust gases from a vehicle will not be blown against the direction of travel allowing the time which an exhaust plume passes a certain point after the exhaust stack to be calculated. This calculation is based on the speed of the smoky vehicle, the height of the point above the stack and the vertical velocity of the exhaust outlet. It will be appreciated that this calculation is significant for determining the distance that the vehicle has travelled by the time the exhaust plume has been detected in order that the camera may be placed at an appropriate distance from the smoke detector. Ideally the positioning is fine tuned during operations.

These smoke detectors are made of an infrared beam transmitter and a receiver. The infrared beam emitted by the transmitter is directed to the receiver that converts the incident radiation in an electric signal. In operation, smoke travels up and intercepts the infrared beam causing a corresponding change in the electrical state of the receiver which is measured with respect to time. High rate changes are the result of the instantaneous introduction of a new high level of smoke, which indicates the passage of a smoky vehicle.

As discussed above, there is considerable variation in the time that exhaust emissions take to reach smoke detectors. It is therefore not a suitable method of activating a camera to capture a vehicle's registration number plate. The alternative embodiment provides an alternative to this mode of detection.

The method of the alternative embodiment is based on an interaction between the smoke detector used to detect a smoky vehicle and a camera system used to capture an image of the offending vehicle. This is preferably achieved with the use of a light beam connected to the PLC Control System In operation therefore a vehicle passes through and breaks the light beam which, instantly operates a camera. The light beam is placed at a suitable height so that only vehicles of interest, in this case heavy vehicles/trucks, have a height sufficient to pass through the beam. Vehicles like cars, bikes, vans and four wheel drives are not being targeted by the embodiment and will not activate the camera since they will not break the light beam.

Logically, the camera need only be triggered if the vehicle is a smoky vehicle. Accordingly, the output of the interrupted light beam only triggers the camera if the smoke detector has also been triggered immediately prior.

A suitable camera system for carrying out the method of the alternative embodiment is for example the Redflex system available from Redflex Traffic Systems of Scottsdale, Ariz. and Melbourne, Victoria, Australia.

The foregoing described specific embodiments of the present invention. Modifications, obvious to those skilled in the art can be made thereto without departing from the scope of the invention.

The invention claimed is:

1. A method for identifying a moving vehicle continuously exceeding a predetermined level of particulate emissions, said method including the steps of:

detecting the rate of change of particulate emissions in the atmosphere immediately above said vehicle at a first detection station;

detecting the rate of change of particulate emissions in the atmosphere immediately above said vehicle at a second detection station downstream station;

recording information identifying said vehicle if the rate of change of detected emission of said vehicle at either station exceeds said predetermined level; and examining said recorded information from both stations and identifying said vehicle if its identity appears in said recorded information for both station;

and observing video information to determine whether a continuous particulate emission has occurred.

2. A method as claimed in claim 1, wherein detection of said predetermined level of particulate emissions at either station enables an image capturing device downstream of its respective detection station for automatic actuation by said vehicle, said image capturing device, capturing a series of images of the particulate emissions of said vehicle and said method further comprises the step of examining said series of images to determine if said vehicle is emitting particulates over a predetermined time period.

3. A method as claimed in claim 2, wherein said image capturing device is triggered by interruptible light beam actuated by said vehicle breaking said light beam.

4. A method as claimed in claim 1, wherein the particulate emissions are detected by the triggering of a smoke detector beam.

5. A method as claimed in claim 1, wherein said particulate emissions are exhaust emissions emitted from a vertical exhaust.

6. A method as claimed in claim 2, wherein said image capturing device captures an image of the registration number of said vehicle.

7. A method according to claim 6, wherein said image of said registration number is OCR scanned.

8. A method as claimed in claim 2 wherein said image capturing device includes video devices for taking full motion video of an image.

9. A method as claimed in claim 1, wherein detecting takes place in a tunnel, a bridge or on open roadway.

10. A method as claimed in claim 1, wherein detecting takes place when said vehicle is travelling above a minimum speed that precludes stop start traffic or is slower than the speed vector of surrounding air in the direction of travel of the vehicle.

11. An apparatus for identifying a moving vehicle exceeding a predetermined level of particulate emissions, said apparatus including:

first detection means for detecting the rate of change of particulate emissions in the atmosphere immediately above said vehicle at a first detection station;

second detection means for detecting the rate of change of particulate emissions in the atmosphere immediately above said vehicle at a second detection station downstream of said first station;

recording means for recording information identifying said vehicle if the detected emission in the atmosphere immediately above said vehicle at either station exceeds said predetermined level and further visually recording the particulate emissions of said vehicle over an extended time period;

comparison means for comparing said recorded information from both stations; and image recognition means for identifying said vehicle if its identity appears in said recorded information for both stations.

12. A system for identifying a vehicle emitting a high level of particulate emissions, the system comprising:

a first particulate detection system for detecting the rate of change of particulate emission from a vehicle in the atmosphere immediately above the vehicle as it transits a first transit point;

a image triggering means located at a second transit point;

a first imaging means interconnected to said triggering means for imaging vehicles and further visually recording the particulate emissions of said vehicle over an extended time period as they transit said second transit point;

a processing means interconnected to said first particulate detection means and said first imaging means for locating identification parameters associated with the imaged vehicles when said first particulate detection system detects an emission exceeding a predetermined level.

13. A system as claimed in claim 12 wherein said first particulate detection system is located above a vehicle carriageway.

14. A system as claimed in claim 12 wherein said image triggering means includes a light beam shone across a path substantially perpendicular to the direction of travel of said vehicle either horizontally or vertically.

15. A system as claimed in claim 14 wherein the path of said beam is located at least 2 meters above the contact point of said vehicle with the ground.

16. A system as claimed in claim 12 wherein vehicles normally transit said first and second points in a predetermined direction and said first point is located before said second point.

17. A system as claimed in claim 12 further comprising:

a second particulate detection system for detecting emission from a vehicle as it transits a third transit point;

a second image triggering means located at a fourth transit point;

a second imaging means interconnected to said second image triggering means for imaging vehicles as they transit said fourth transit point;

a second processing means interconnected to said second particulate detection means and said second imaging means for locating identification parameters associated with the imaged vehicles when said second particulate detection system detects an emission exceeding a predetermined level.

18. A system as claimed in claim 17 further comprising a comparison means for comparing vehicles detected by said first processing means and said second processing means to determine if they are the same vehicle and to output an indicator of sameness.

19. A system as claimed in claim 12 wherein said first particulate detection system includes a series of particulate emission detection units setup to detect particulate emissions at different heights.

* * * * *